United States Patent [19]

Lubinsky et al.

[11] Patent Number: 4,827,281

[45] Date of Patent: May 2, 1989

[54] PROCESS FOR CORRECTING DOWN-THE-PAGE NONUNIFORMITY IN THERMAL PRINTING

[75] Inventors: Anthony R. Lubinsky, Webster; James F. Schmitt, Fairport; Cory L. Krajewski, Rochester, all of N.Y.

[73] Assignee: Eastman Kodak Company, Rochester, N.Y.

[21] Appl. No.: 207,563

[22] Filed: Jun. 16, 1988

[51] Int. Cl.[4] .......... G01D 15/10

[52] U.S. Cl. .......... 346/1.1; 346/76 PH

[58] Field of Search .......... 346/1.1, 76 PH

[56] References Cited

U.S. PATENT DOCUMENTS

| | | | |
|---|---|---|---|
| 4,284,876 | 8/1981 | Isibashi et al. | 219/216 |
| 4,415,904 | 11/1983 | Inui et al. | 346/1.1 |
| 4,449,136 | 5/1984 | Moriguchi et al. | 346/76 PH |
| 4,536,774 | 8/1985 | Inui et al. | 346/76 PH |
| 4,574,293 | 3/1986 | Inui et al. | 364/76 PH |
| 4,587,530 | 5/1986 | Noguchi | 346/76 PH |
| 4,688,051 | 8/1987 | Kawakami et al. | 346/76 PH |

FOREIGN PATENT DOCUMENTS

| | | |
|---|---|---|
| 0194874 | 11/1984 | Japan . |
| 0072757 | 4/1985 | Japan . |
| 0090780 | 5/1985 | Japan . |

*Primary Examiner*—E. A. Goldberg

*Assistant Examiner*—Gerald E. Preston

*Attorney, Agent, or Firm*—Edward Dugas

[57] ABSTRACT

The present invention provides a method for correcting the density nonuniformities that occur down the page of a thermally printed document by providing a correction component, representing heating pulses, to each thermal printing element as a function of the line on which the thermal printer is printing. The correction component is determined from the product of a correction factor times the logarithm of the total number of lines to be printed divided by the number of the line next to be printed. The correction factor is calculated from the average number of heat pulses to be applied across the head at any time, or as a compromise a single number may be selected.

8 Claims, 6 Drawing Sheets

$$\tilde{N}_{iL} = N_{iL} + A \log[LT/L]$$

PROCESS FOR CORRECTING DOWN-THE-PAGE NONUNIFORMITY IN THERMAL PRINTING

TECHNICAL FIELD OF THE INVENTION

The present invention relates to the field of thermal printing, and more particularly to a process for improving the uniformity of the printing by a thermal print head.

BACKGROUND OF THE INVENTION

One method of printing continuous tone images makes use of a thermal print head, heat sensitive media and a means for moving the media relative to the thermal print head. Most thermal print heads are a one-dimensional array of heating elements (often with integral driver IC's and shift registers) mounted on a ceramic substrate. The ceramic substrate is then mounted to a heat sink which may be metal. In systems utilizing this type of thermal print head it is often observed that the printing density is not uniform down the page, but rather increases with time even when the input is a constant (flat) field. This is due to the accumulation of heat in the material surrounding the line of heating elements. The problem of the increase in temperature of the material surrounding a line source of heat has been addressed in a book by Carslaw and Jaeger, entitled "Conduction of Heat in Solids", 2nd Ed. Page 339. The analysis disclosed in that book shows that the temperature at a distance R from a line source of heat of flux Q and radius a which is turned on at a time t=0, is for large values of the time equal to:

$$T = T(O) + \frac{Qa}{2K} \ln\left[\frac{4kt}{Cr^2}\right] + \text{(higher order terms)} \quad (1)$$

where:

T is the temperature
K is the thermal conductivity,
k is the thermal diffusivity, and
C is a constant.

A patent of interest for its teaching in this art is U.S. Pat. No. 4,688,051 entitled "Thermal Print Head Driving System" by T. Kawakami et al. The system of that patent supplies a predetermined number of driving pulses to each of a plurality of heat-producing elements arranged in a line. The pulse width of the driving pulses are controlled in accordance with the temperature at, or in the vicinity of, the heat-producing elements. This control maintains the density level of like tones at a substantially constant value. Also, in one aspect of that invention the number of driving pulses corresponding to a desired tone level, is altered in consideration of data collected from at least one of the preceding recording lines.

Another patent of interest is Japanese Patent No. 59-194874 entitled "Thermal Head Driver" by Mamoru Itou. The driver of that patent strives for a uniform printing density by controlling the spacing between constant pulse width current signals that are applied to heating resistors with the space between the pulses varying in accordance with the temperature of a substrate that forms part of the thermal print head. In this manner, as the temperature of the thermal print head increases the space between successive pulses is also increased due to the fact that less energy is needed to bring the heating elements up to a recording temperature. In a like manner, if the temperature of the head decreases the space between pulses is decreased in order to provide more heating energy to the heating elements.

Another patent of interest is Japanese Patent No. 60-72757 entitled "Thermal Recorder" by Kazushi Nagato. The recorder of that patent attempts to unify the image density in a screen of thermal printing by counting the number of lines from the starting point of printing to control the energized pulse width according to the line count. This technique counteracts the effect of having a cold head when the first lines of the image are being recorded versus having an extremely warm or hot head as the printer approaches the end of the page after having recorded many lines of image data.

Another patent of interest is Japanese Patent No. 60-90780 entitled "Thermal Printer" by Nobuaki Aoki. In that patent, printing pulses are controlled as a function of the number of pieces of data printed and the period of time corresponding to the printing. The system of that patent more specifically counts data for controlling the printing pulses during the printing of one piece of data and a timer counts the period of time elapsed between the end of printing of a first document and the start of printing for a subsequent document. The duration of time between printings is related to the cooling effect that will occur in a thermal print head from a start position corresponding to the count of dots existing for the previous printed page. This cooling will of course, if left uncompensated, cause a variance in the print density at the start of printing of the next document or image in the sequence.

From the foregoing it can be seen that control of the density of print by thermal printers is a problem that has been approached in a number of ways with the desired result being a uniform density down a printed page of data. The present invention is directed towards a solution to that problem.

SUMMARY OF THE INVENTION

The method of the present invention determines the total number of lines to be printed along with a correction factor which may be stored. The correction factor may be calculated from the average number of heat pulses to be applied to the head in printing a particular image or may be stored as a single number. The number of the line to next be printed is determined and the numbers of pulses corresponding to the densities of the image to be printed on that line are determined. These numbers of pulses correspond to an uncorrected set of numbers. A correction component is determined from the product of the correction factor times the logarithm of the total number of lines to be printed divided by the number of the line next to be printed. The correction component is combined with the uncorrected numbers to provide a corrected set of pulse numbers which in turn causes the corresponding number of pulses to be applied to the corresponding heaters of the thermal print head thereby correcting for down the page density variations.

From the foregoing it can be seen that it is a primary object of the present invention to provide a method for correcting for density variations down the page of a thermally printed sheet.

It is a further object of the present invention to provide a correcting method for thermal print heads.

These and other objects of the present invention will become more apparent when taken in conjunction with the following description and drawings wherein like characters indicate like parts and which drawings form a part of the present application.

DESCRIPTION OF THE PREFERRED EMBODIMENT

Figure 1:
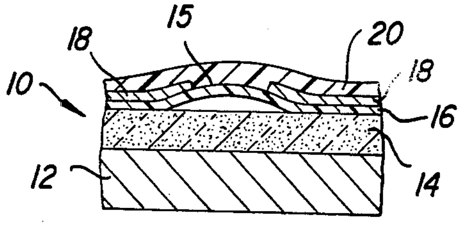
FIG. 1 is a cut-away sectioned view of a printing element from a one-dimensional thermal head array.

Referring to FIG. 1, a section of a printing element of the type used in a one-dimensional array thermal head 10 is shown comprised of a heat sink 12 onto which is fixed and/or deposited a ceramic layer 14. A resistance heating element 16 is positioned on the ceramic material 14 with a projecting section 15. Deposited onto the resistance element 16 is a pair of conductors 18 which transmit current pulses to the resistance element 16 to heat the resistance element in the area of the projection 15. A protective layer 20 is deposited onto the conductors 18 and the projection portion 15 of the resistance element 16 to provide a wear surface that protects the resistor 16 and conductors 18. The one-dimensional array is formed by positioning a number of the heating elements 10 onto a heat structure. Each of the heating elements may be independently selected to be heated in order to print an element of an image.

Figure 2:
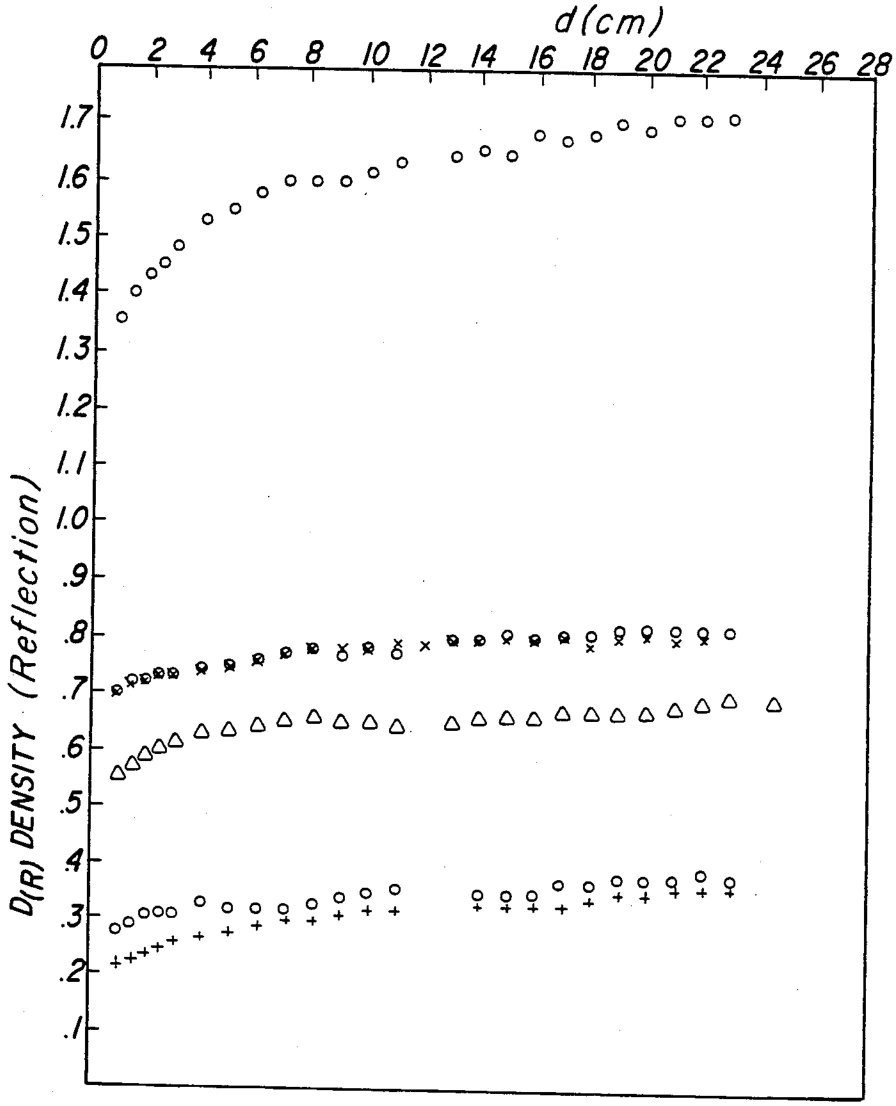
FIG. 2 is a chart illustrating the non-uniformity of the printing density down the page with a constant input field.

Referring now to FIG. 2, the curve shown therein illustrates the variance in print density from one line to another as the print head moves down a print page. This variance occurs even when the inputs to each heating element remain at an equal and constant level, corresponding to a flat image field. This particular density variation is due to the accumulation of heat in the material surrounding the line of heating elements. The temperature formula:

$$T = T(O) + \frac{Qa}{2K} \ln\left[\frac{4kt}{Cr^2}\right] + \text{(higher order terms)} \quad (2)$$

wherein K and k are the thermal conductivity and the thermal diffusivity of the material, respectively, and C is a constant, can be used as the basis for concluding that the down-the-page density variation can be quantified by the logarithm of the distance, or line number, down the page, measured from the start of printing.

Figure 3:
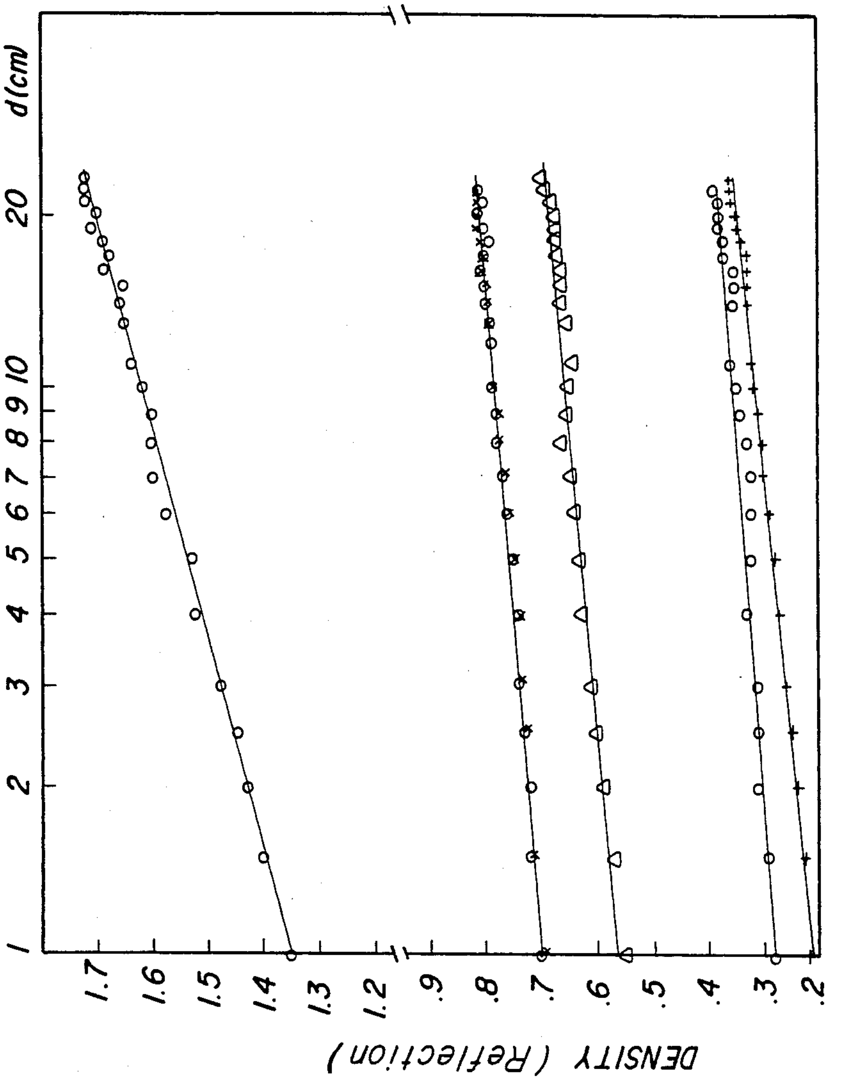
FIG. 3 is a group of plots illustrating the increase in print density as a function of the number of input heat pulses and the logarithm of the distance down the page.

In FIG. 3, there is shown the measured density for flat fields of various input levels, versus the logarithm of the distance, or line number. The variation in density is described by:

$$\Delta D = S(N_p) \log L \quad (3)$$

where $N_p$ is the average number of heat pulses per pixel for all of the lines of a page to be printed; and L is the line number.

Figure 4:
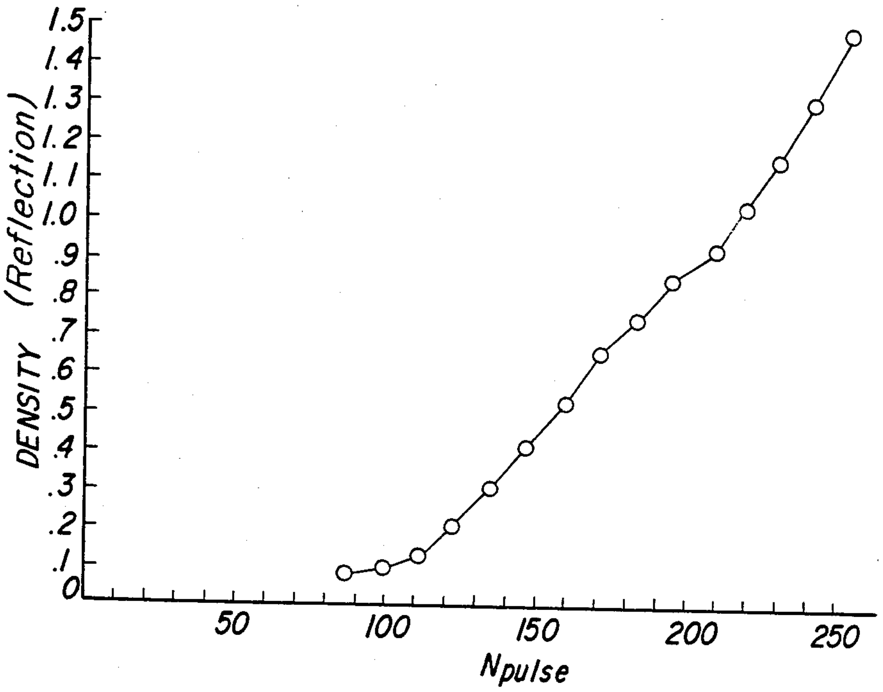
FIG. 4 is a graph illustrating the increase in print density as a function of the number of heat pulses.

The graph of FIG. 4 illustrates that the print density at any particular line number varies with the number of heat pulses $N_p$ applied. The change in density when $N_p$ changes is:

$$\Delta D = \gamma(N_p)\Delta N_p \quad (4)$$

From equations (3) and (4), correction for the variation in density, as the line number varies, is achieved by varying the number of heat pulses down the page:

$$\Delta N_p^{corr}(L) = [S(N_p)/\gamma(N_p)]\log[L_{total}/L] \quad (5)$$

or, $$\Delta N_p^{corr}(L) = A(N_p)\log[L_{total}/L] \quad (6)$$

Figure 5:
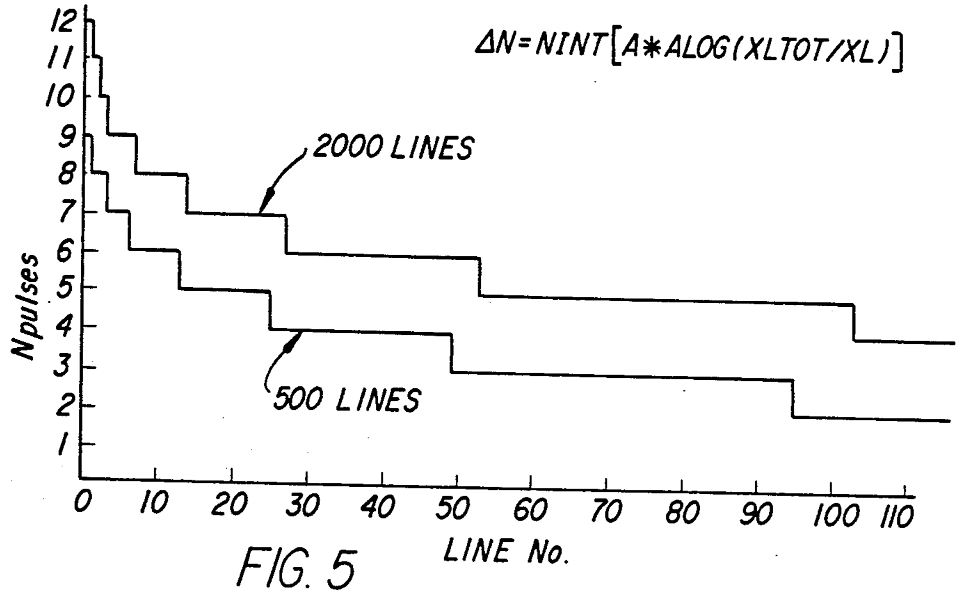
FIG. 5 is a graph illustrating the numbers of correcting pulses versus the line number for some typical heating values and print lengths.

Here $\Delta N_p^{corr}(L)$ is the number of heat pulses to be added, L is the line number starting from the first line or printed data, $L_{total}$ is the total number of lines to be printed, $S(N_p)$ is the slope of the curve of density versus log L, and $\gamma(N_p)$ is the slope of the curve of density versus $N_p$ (both slopes may vary with $N_p$). A graph of $\Delta N_p^{corr}$versus L for typical values of S, $\gamma$ and $L_{total}$ is shown in FIG. 5.

Figure 6:
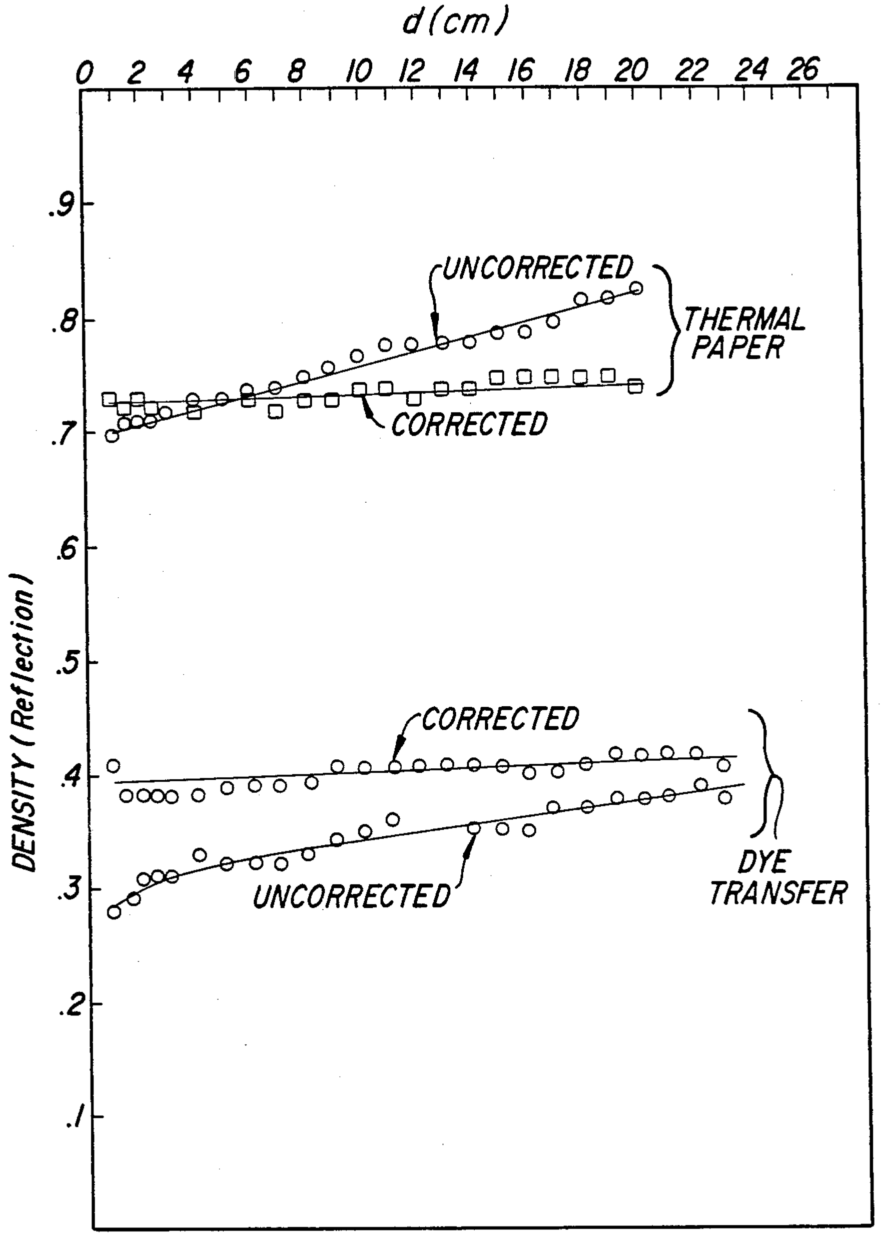
FIG. 6 is a graph illustrating the density variations for uncorrected and corrected thermal prints.

FIG. 6 illustrates a comparison of print density from a thermal print head printing uncompensated and a thermal print head, of the same physical structure, printing with compensation in accordance with equation 5. As can be seen from the plot, the corrected head density variations down the page are much smaller than the density variations for an uncorrected head.

Figure 7:
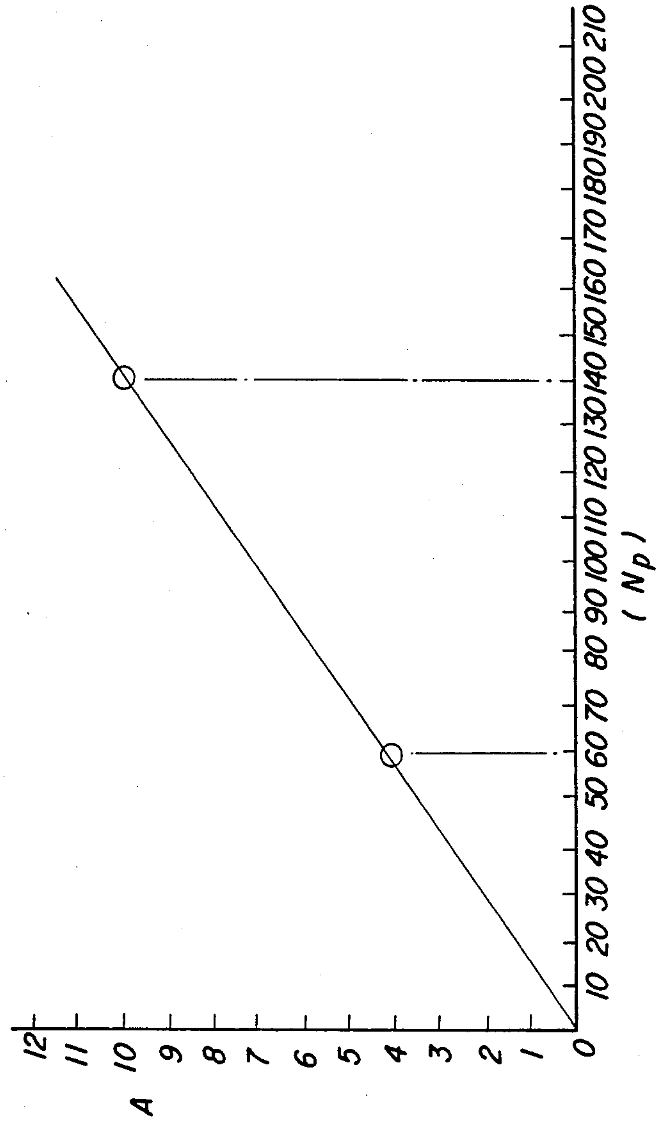
FIG. 7 is a graph illustrating the value of a correction factor A as a function of the average number of heat pulses per pixel.

In addition, by varying the correction factor $A(N_p)=S(N_p)/\gamma(N_p)$, we were able to compensate for and correct the down-the-page density variation, even for thermal media with widely different contrast responses ($\gamma$'s). The correction factor $A(N_p)$ was formed to be a function of the average number of heat pulses per pixel, $N_p$, as in FIG. 7.

By knowing in advance the average value of $N_p$ for a particular print, a value of A may be selected from the graph. Alternately, one may use a single value of A, corresponding to the range of $N_p$where the defect is most visible.

We found that contouring, or digitization noise introduced by the correction algorithm, depending on the printing scheme and the number of quantization levels. With $2^8=256$ levels, contouring was just visible at low densities, with certain print schemes, and not visible with other schemes. In general, at least 256 levels should be used.

Figure 8:
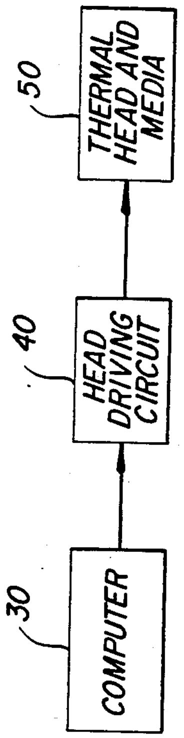
FIG. 8 is a block diagram of the apparatus used for implementing the method of the present invention.

FIG. 8 depicts in block diagram form the apparatus for performing the method of the present invention. The computer 30 stores a correction algorithm along with a density look-up table for converting density to the number of heat pulses required to replicate the image desired onto a thermal media. The output from the computer is a set of data signals describing the number of pulses associated with each element of the image array, which are directed to a head driving circuit 40, which head driving circuit transmits signals to a thermal head and media block 50 which cause each heating element in the thermal head to be energized by the appropriate number of power pulses in each printed line to expose the media to the printing temperatures.

Figure 9:
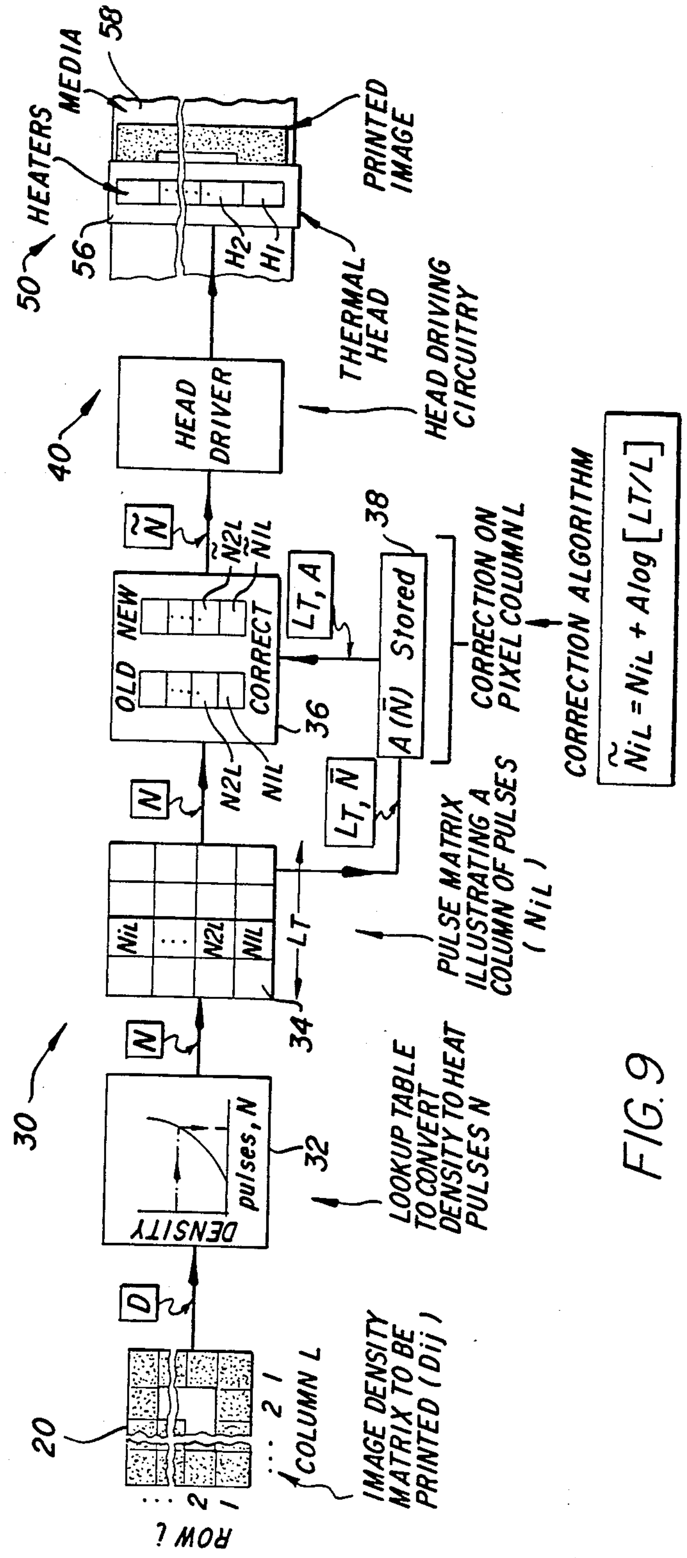
FIG. 9 is a detailed block diagram illustrating the steps of the process of the present invention.

Referring now to FIG. 9 wherein is illustrated a more detailed block diagram of the steps of the present invention along with the associated implementation hardware. The image to be printed is represented by block 20 comprised of density pixels arranged in rows and columns. Each density element is directed to a look-up table 32 contained within the computer 30. The input density value denoted D is applied to the look-up table and the output from the table is a number N of uncorrected pulses. These uncorrected numbers are stored in a pulse matrix 34 so as to provide $L_{total}$columns of pulse numbers $N_{iL}$, where i denotes the particular heating element, L denotes the line number in the image to be printed, and $L_{total}$ is the total number of lines to be printed. From this matrix of numbers if found an average number $\overline{N}$, and this number is inputed to the look-up table 38. The correction algorithm calculates the number of correction pulses, given the factor A, the total lines $L_T$, and the line number L, as in equation (6). The uncorrected numbers of pulses N are then combined with the correction pulses, per the correction algorithm, in a combining block 36 to provide a corrected number of pulses $\tilde{N}_{iL}$. These corrected pulses are directed to the head driving circuitry 40 and in turn to the thermal print head 56 with each element 10 of the thermal head denoted generally as Hi through Hn. The heating elements, being responsive to the respective corrected number of pulses $\tilde{N}_{iL}$, will replicate the image density from the image density matrix 20 onto the media 58.

Although one particular form of apparatus has been disclosed for implementing the method of the present invention, it can be appreciated that various variations can be utilized by persons skilled in the art without departing from the spirit of the invention.

Therefore, while there has been shown what is considered to be the preferred embodiment of the present invention, it will be manifest that many changes and modifications may be made therein without departing from the essential spirit of the invention. It is intended, therefore, in the annexed claims to cover all such changes and modifications as may fall within the true scope of the invention.

We claim:

1. A method for correcting down-the-page nonuniformity in a multiple heating element thermal print head comprising the steps of:

(a) determining the total number of lines to be printed;

(b) determining a correction factor in the number of heat pulses from the average number of heat pulses to be applied to the thermal print head for printing an image;

(c) determining the line next to be printed;

(d) determining the number of pulses corresponding to the densities of the image to be printed on that line;

(e) computing a correction component from the product of the correction factor and the logarithm of the total number of lines to be printed divided by the number of the line next to be printed;

(f) combining the computed correction component with the number of pulses determined in step (d) and apply the combined number of pulses to the thermal print head; and (g) repeat steps (c) through (f) for all of the lines to be printed.

2. The method according to claim 1 wherein said correction factor determined in step (b) is determined by the value $A(N_p)$ which is equal to $S(N_p)/\gamma(N_p)$ wherein:

$N_p$ is the average number of heat pulses per pixel, $\gamma$ is a function of the contrast response of the printing medium, $S(N_p)$ is the slope of the curve of density versus log L and wherein L is the line number.

3. A method for correcting down-the-page nonuniformity in the printing density of a pulse driven thermal print head comprising the steps of:

(a) determining the total number of lines ($L_{total}$ to be printed;

(b) computing the correction number of heating pulses $\Delta N_p^{corr}(L)$ to be added to the thermal print head driving pulses from the following:

$$\Delta N_p^{corr}(L) = [S(N_p)/\gamma(N_p)]\log\,[L_{total}/L]$$

where:

$S(N_p)$ equals the slope of the printing density versus log L, where L is one particular line of print, $\gamma(N_p)$ equals the slope of the printing density versus $N_p$, where $N_p$ equals the average number of heat pulses per pixel; and (c) combining the correction number of heating pulses with the thermal print head driving pulses to correct for printing nonuniformities.

4. A method for correcting down-the-page nonuniformity in a pulse driven thermal print head comprising the steps of:

(a) determining the total number of lines to be printed;

(b) determining the average number of pulses to be used to print the total number of lines;

(c) forming a correction factor as a function of the average number of pulses determined in step (b);

(d) determining a correction number of pulses using the correction factor, formed in step (c), times the log of the total number of lines of the print page divided by the number of the particular line to be printed;

(e) adding the correction number of pulses determined in step (d) to the number of pulses representing the image to be printed; and (f) repeating steps (d) and (e) for each line of print.

5. The method according to claim 4 wherein the formed correction factor of step (c) is formed empirically.

6. A method for correcting down-the-page nonuniformity in a thermal print head by determining the number of lines to be printed and the number of pulses to be used to print the lines and adjusting the number of pulses applied to the thermal print head as a function of the number of lines previously printed.

7. A method according to claim 6 wherein the number of pulses to be used to print the lines are averaged over the number of print positions for all of the lines to derive a correction factor that is used to adjust the number of pulses applied to the thermal print head.

8. A method according to claim 7 wherein the number of pulses applied to the thermal print head include a component that is formed from the product of the correction factor times the log of the total number of lines to be printed divided by the number of the line to be printed.

* * * * *